No. 12,832.

J. McE. AMES.

REISSUED JULY 21, 1908.

TANK CAR.

APPLICATION FILED DEC. 19, 1907.

3 SHEETS—SHEET 1.

WITNESSES:

M. Langer

Frank M. Cooper

INVENTOR

John McE. Ames

By

T. H. Gibbs

ATTORNEY

No. 12,832.

REISSUED JULY 21, 1908.

J. McE. AMES.

TANK CAR.

APPLICATION FILED DEC. 19, 1907.

3 SHEETS—SHEET 2.

WITNESSES:

M Langer

Frank C. Cooper

INVENTOR

John McE. Ames

BY

F. H. Gibbs

ATTORNEY

No. 12,832.
REISSUED JULY 21, 1908.
J. McE. AMES.
TANK CAR.
APPLICATION FILED DEC. 19, 1907.
3 SHEETS—SHEET 3.
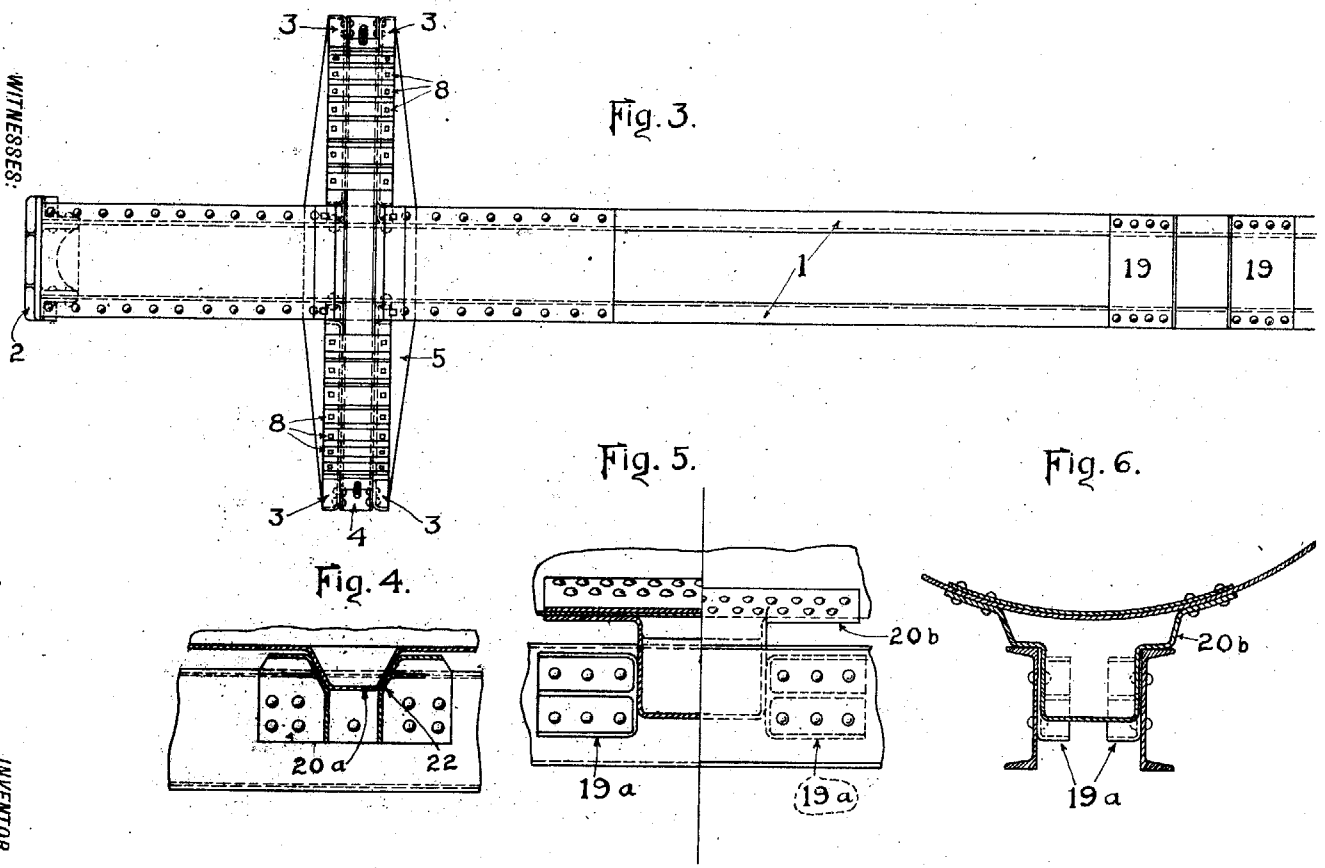
WITNESSES:
M. Langer
Frank L. Cooper
INVENTOR
John McE. Ames
BY
J. H. Gibbs
ATTORNEY

UNITED STATES PATENT OFFICE.

JOHN McE. AMES, OF NEW YORK, N. Y., ASSIGNOR TO AMERICAN CAR & FOUNDRY COMPANY, OF ST. LOUIS, MISSOURI, A CORPORATION OF NEW JERSEY.

TANK-CAR.

No. 12,832. Specification of Reissued Letters Patent. Reissued July 21, 1908.

Original No. 8 7,571, dated June 25, 1907, Serial No. 349,878. Application for reissue filed December 19, 1907. Serial No. 407,268.

*To all whom it may concern:*

Be it known that I, JOHN McE. AMES, a citizen of the United States, residing at the city and State of New York, county of Richmond, Staten Island, have invented a certain new and useful Improvement in Tank-Cars, of which the following is a full, clear, and exact description, such as will enable others skilled in the art to which it appertains to make and use the same, reference being had to the accompanying drawings, forming part of this specification, in which—

Figure 1:
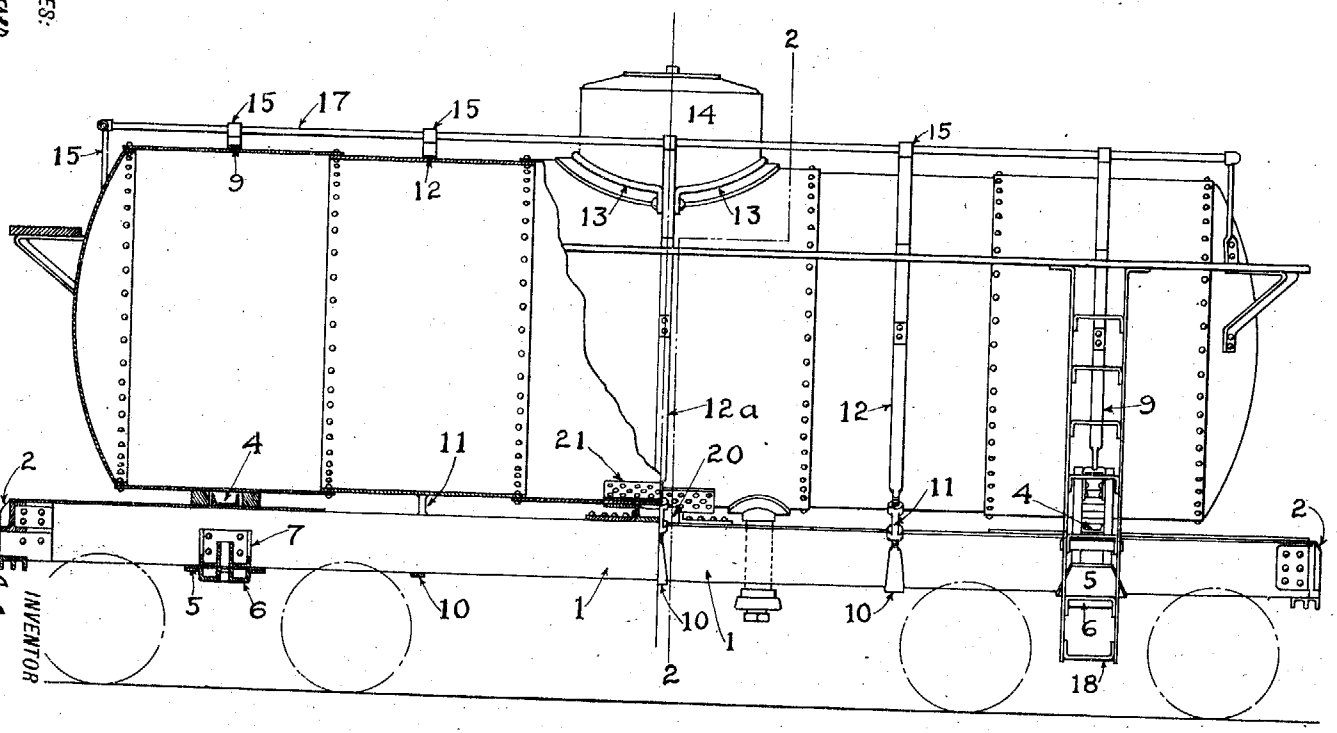
Figure 2:
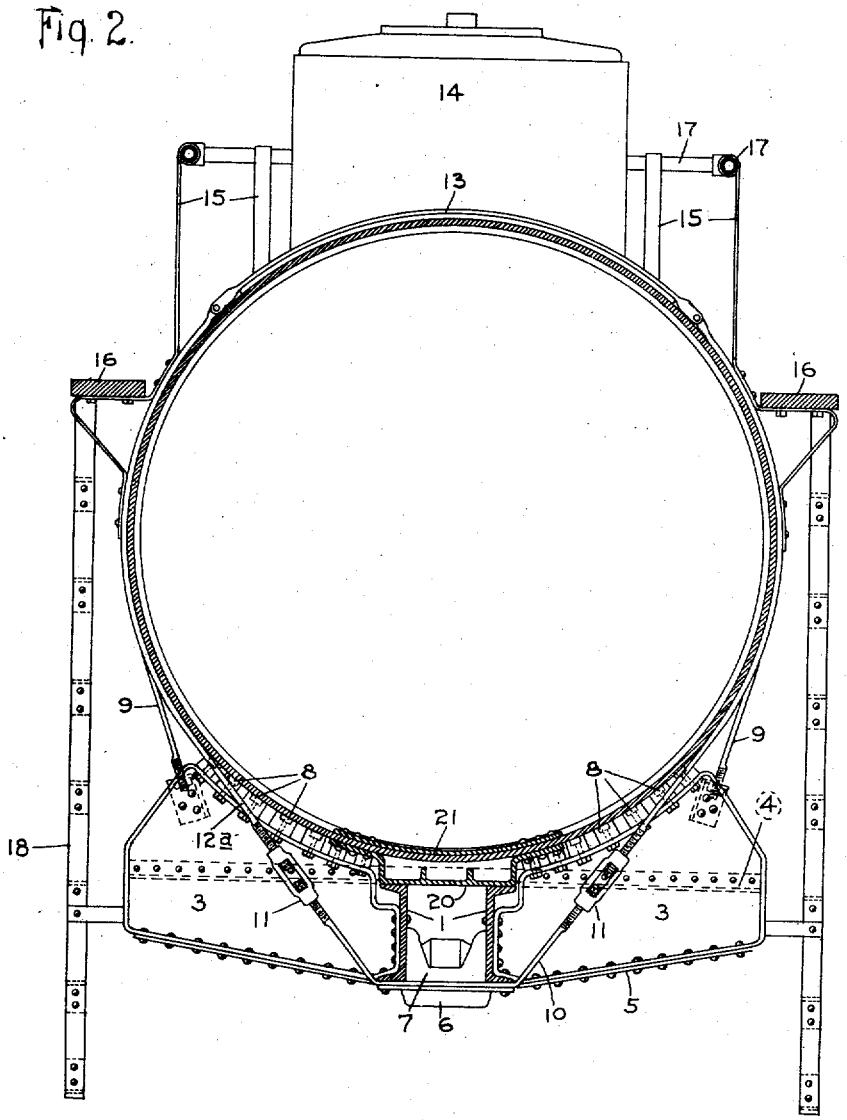

Figure 1 is a side elevational view, partly in vertical section, of my improved tank car; Fig. 2 is a sectional view taken on the line 2—2 of Fig. 1; Fig. 3 is a plan view of a portion of the underframe; Fig. 4 illustrates a modified form of interlocking members between the tank and underframe; and Figs. 5 and 6 illustrate a further modification.

This invention relates to new and useful improvements in tank cars.

The usual practice in tank car construction is to mount the tank on an underframe, and to prevent the tank from rolling, bands, which extend over the tank, are secured to the underframe. To prevent the tank from shifting longitudinally, head blocks which serve as abutments for the ends of the tank are usually secured on the underframe.

In the preferred form of my invention the tank is tied to an underframe by means of bands in the usual manner. The head blocks are replaced by lugs secured to the underframe near the center of the car, which lugs serve as abutments for a projection carried by the tank. The advantage of this construction is that the tank is free to expand and contract independently of the underframe, as it is not connected by rivets or similar fastening devices to the underframe.

Referring to the drawings, the underframe comprises body bolsters located near the ends of the car and secured to the longitudinal sills 1. Buffer blocks 2 riveted to the ends of the longitudinal sills are adapted to receive suitable draw-bars.

The body bolsters herein shown are built up of flanged diaphragms 3 which extend outwardly from the longitudinal sills, said diaphragms being connected by a channel 4 arranged above the longitudinal sills and a plate 5 below said sills. Center bearings 6 are secured to the under side of the body bolsters, and filler blocks, 7 are interposed between the longitudinal sills above the center bearings. The tank rests on wood blocks 8, which blocks are secured to the curved top portion of the body bolsters.

Bands 9 are secured to the body bolsters and extend over the tank. Straps 10 extend under the longitudinal sills and are connected by turn-buckles 11 to tank bands 12 and $12^a$, the bands $12^a$ being connected to curved rods 13 which surround the tank dome 14.

Brackets 15 are preferably secured to the tank bands and support a running board 16 and a hand rail 17. A ladder 18 is secured to the running board.

Flanged plates 19 are secured to the underframe, preferably near the center of the car. A casting or pressed metal member 20 is secured to the tank and extends downwardly between the flanges of the plates 19. The member 20 is preferably provided with curved flanges which are riveted to the tank, the rivets passing through a plate 21 located inside the tank. The plate 21 reinforces the tank structure at this point and reduces the liability of leakage.

From the foregoing it will be understood that the member 20 which projects from the tank is held in interlocking engagement with the flanged plates 19 by means of the tank bands. However, any suitable connections between the tank and underframe may be employed in lieu of the tank bands as the same forms no part of the invention.

Fig. 4 illustrates a modification in which a casting provided with a recess 22 in its upper face is secured to the underframe, and one of the tank sheets is pressed out to form a projection $20^a$, which projection is located in the recess 22.

In the modifications shown in Figs. 5 and 6, a casting or pressed metal member $20^b$ is riveted to the bottom of the tank and rests on the longitudinal sills. A portion of the member $20^b$ extends downwardly between lugs $19^a$ which are riveted to the inside of longitudinal sills $1^a$. Various other modifications may be made from the design herein shown; for example, a cross bearer could be secured to the longitudinal sills and lugs carried by the tank located on each side of said cross bearer.

Having thus described the invention, what is claimed as new and desired to be secured by Letters Patent is:

1. In a tank car, the combination with a tank, of a frame, and interlocking members forming abutments between the tank and frame, which members are designed at all times to receive end thrusts and allow the tank to expand substantially throughout its length, substantially as described.

2. In a tank, the combination with an underframe, of a tank mounted on said underframe, and interlocking members forming abutments between the tank and frame, which members are designed at all times to receive end thrusts and allow the tank to expand substantially throughout its length; substantially as described.

3. In a tank car, the combination with a tank, of a frame, and interlocking members at the center of the car which prevent the tank from shifting longitudinally; substantially as described.

4. In a tank car, the combination with an underframe, of a tank mounted on the underframe, and interlocking members at the center of the car which prevent the tank from shifting longitudinally; substantially as described.

5. In a tank car, the combination with an underframe including body bolsters, of a tank supported by the underframe, and interlocking members arranged between the body bolsters, said interlocking members forming abutments which prevent the tank from shifting longitudinally and allow it to expand; substantially as described.

6. In a tank car, the combination with a tank, of an underframe, bands anchored to the underframe and extending over the tank, and interlocking members which prevent the tank from shifting longitudinally and allow it to expand, the relative position of said interlocking members being constant; substantially as described.

7. In a tank car, the combination with a tank, of an underframe, bands anchored to the underframe and extending over the tank, and interlocking members between said tank and frame which prevent the tank from shifting longitudinally, the relative position of said interlocking members being constant; substantially as described.

8. In a tank car, the combination with a tank, of an underframe bands anchored to the underframe and extending over the tank, and interlocking members at the center of the car which prevent the tank from shifting longitudinally; substantially as described.

9. In a tank car, the combination with a tank, of a frame, lugs secured to said tank and frame near the center of the car, which lugs interlock and prevent the tank from shifting longitudinally; substantially as described.

10. In a tank car, the combination with a tank, of an underframe, lugs secured to the underframe near the center of the car, and a projection carried by the tank arranged between said lugs; substantially as described.

11. In a tank car, the combination with a tank, of an underframe, lugs secured to the underframe near the center of the car, and a projection carried by the tank arranged between said lugs; substantially as described.

12. In a tank car, the combination with a tank, of a frame including body bolsters, a tank-supporting member near the center of the car, and lugs coöperating with said tank-supporting member to prevent the tank from shifting longitudinally; substantially as described.

13. In a tank car, the combination of a tank, an underframe, and interlocking members on said tank and underframe, said members being located at the center of the car and having coincident engaging faces; substantially as described.

14. In a tank car, the combination with a tank, of a frame, interlocking members between said tank and frame, one of which interlocking members is riveted to the tank near the center thereof, the rivets passing through a reinforcing plate located inside of the tank; substantially as described.

15. In a tank car, the combination with a tank, of an underframe, and interlocking members between said tank and underframe, one of which interlocking members is secured to the underframe near the center thereof, substantially as described.

16. In a tank car with a center girder or sill, a tank support, a tank thereon, abutments on said girder, a flanged depending stop member below said tank coöperating with said abutments, a reinforcing plate within the tank and means uniting the flange of said depending member and said plate.

17. In a tank car, the combination of a tank, an underframe, lugs secured to the underframe near the middle of the car, a projection having lateral flanges secured to the tank and adapted to project to the plane of said lugs and a reinforcing plate secured within the tank and to said projection.

18. In a tank car, the combination comprising an underframe, a tank supported thereby, lugs on said underframe and a hollow stop depending from said tank between said lugs all arranged to prevent longitudinal movement of the tank and permit free expansion of said tank at each side of said lugs.

19. In a tank car, the combination comprising an underframe with a center sill girder, a tank supported thereabove, a reinforcing plate within said tank, a stop having curved flanges relatively coincident with said plate and having a depending portion below said flanges and lugs on said girder coöperating with said stop at each side thereof.

20. In a tank car, an underframe, a tank, a stop secured to the middle portion of said tank, said stop comprising a body portion with lateral flanges projecting therefrom and conforming to the contour of said tank and lugs on said underframe coöperating with said stop to prevent longitudinal movement of said tank.

21. In a tank car, an underframe including a center sill girder, a tank, a stop depending from said tank, said stop having flanges extending longitudinally of the tank, a reinforcing plate coöperating with said stop and lugs on said girder, said lugs serving to prevent longitudinal shifting of said tank while permitting free expansion thereof.

22. In a tank car, an underframe, a tank, a hollow projection carried by said tank, flanges on said projection secured to said tank, and lugs on said underframe adapted to coöperate with said projection to hold the tank in position.

23. In a tank car, an underframe, a tank, a hollow projection carried by said tank, curved flanges on said projection secured to said tank, and lugs on said underframe adapted to coöperate with said projection.

24. In a tank car, an underframe, a tank, a hollow projection carried by said tank, longitudinally extending flanges on said projection secured to said tank and lugs on said underframe adapted to coöperate with said projection to serve as a stop to prevent longitudinal displacement of said tank.

25. In a tank car, an underframe, a tank, an abutment secured to said tank relatively midway its length, said abutment having a flange extending longitudinally and transversely thereof, a reinforce member within said tank, means for uniting said abutment, tank and reinforce member, and lugs on said underframe adapted to be impinged by said abutment, the tank being free to expand at each side of said lugs.

26. In a tank car, an underframe, including a center sill girder, a tank, an abutment having a curved seat secured to the lower portion of said tank and depending therefrom, and lugs on said girder adapted to engage said abutment to prevent longitudinal shifting of the tank.

27. In a tank car, an underframe, a tank, a flanged casting secured to the lower portion of said tank and lugs secured to the underframe at each side of said casting.

28. In a tank car, an underframe comprising center sills, a tank, a casting with lateral flanges secured to the lower portion of said tank near the middle portion thereof and extending transversely of said center sills and abutments secured to the underframe at each side of said casting.

29. In a tank car, an underframe including center sills, a tank, a depending casting secured to the lower middle portion of said tank and extending transversely of said center sills and abutments secured to the underframe at each side of said casting, said tank being free to expand at each side of said abutments.

30. In a tank car, an underframe, a tank, lugs on said underframe relatively at its middle portion and a casting secured to said tank and extending between said lugs whereby the tank is secured against longitudinal movement while being free to expand longitudinally.

31. In a tank car, the combination comprising a tank, an outlet valve, an underframe, a hollow casting secured to and extending transversely of said tank independent of the outlet valve at the lower portion of the tank and means on said underframe for preventing longitudinal shifting of said tank.

32. In a tank car, the combination comprising an underframe with center sills, a tank supported above said sills, an outlet valve for said tank, a stop member independent of said outlet valve, depending from said tank relatively between said sills and a coöperating stop member connected with said center sills.

33. In a tank car, the combination comprising bolsters, a sill member connecting said bolsters, a tank removably mounted above said bolsters, a stop casting depending from said tank between said bolsters and means extending transversely of and secured to said sill adapted to prevent longitudinal shifting of said tank.

34. In a tank car, the combination comprising an underframe including bolsters and connecting sill, of a tank removably mounted thereabove, tank bands securing said tank on said underframe, and coöperating disconnected stop members extending transversely of and secured to said tank and sill adapted to prevent longitudinal shifting of said tank.

35. In a tank car, the combination comprising bolsters, a connecting center sill member, a tank removably mounted thereabove, a flanged casting extending transversely of said tank near its middle portion, and means on said center sill adapted to coöperate with said casting to prevent longitudinal shifting of said tank.

36. In a tank car, the combination comprising bolsters, a center sill connection extending through said bolsters, a tank removably mounted thereabove, a transversely extending member depending from the middle portion of said tank and means secured to said sill member adapted to prevent longitudinal movement of said tank.

37. In a tank car constructed without side sills between the bolsters, the combination comprising bolsters, a girder connecting said bolsters, a tank removably mounted thereabove, a downwardly extending member secured to the middle portion of said tank and means secured to and extending transversely of said girder adapted to prevent longitudinal shifting of said tank while leaving it free to expand therebeyond.

38. In a tank car, the combination comprising bolsters, a girder connecting said bolsters, a tank removably mounted thereon, a stop casting secured to the middle portion of said tank and extending transversely of said girder and means extending transversely of said girder adapted to coöperate with said casting to prevent longitudinal shifting of said tank while leaving it free to expand longitudinally therebeyond.

39. In a tank car, the combination comprising bolsters, a continuous center sill girder extending through said bolsters, a tank mounted thereabove, a member depending from the middle portion of said tank and coöperating stops extending transversely of said girder adapted to contact with said depending member to prevent longitudinal shifting of said tank while leaving it free to expand longitudinally.

40. In a railway tank car, the combination comprising a pair of bolsters, a flanged center girder extending through said bolsters, a removable tank extending beyond said bolsters, a casting depending from the middle portion of said tank from above said girder and means extending between flanges of said girder, serving to prevent longitudinal shifting of said tank.

41. In a tank car, the combination comprising a flanged longitudinal girder, bolsters, a tank supported above said bolsters, a depending stop member secured to the lower middle portion of said tank and means extending transversely of said girder, forwardly and rearwardly of said stop, adapted to prevent longitudinal shifting of said tank.

42. In a tank car, the combination comprising a flanged longitudinal girder, bolsters, a tank supported above said bolsters, an outlet valve, a depending stop member secured to the lower middle portion of said tank near said valve and means extending transversely between the flanges of said girder adapted to prevent longitudinal shifting of said tank.

In witness whereof I have hereunto set my hand in the presence of two witnesses.

JOHN McE. AMES.

Witnesses:
F. H. GIBBS,
M. LANGER.